(12) United States Patent
Pierce

(10) Patent No.: US 8,380,543 B2
(45) Date of Patent: Feb. 19, 2013

(54) SYSTEM, METHOD AND INSURANCE PRODUCT FOR INSURING REAL ESTATE TRANSACTIONS

(75) Inventor: Paul Whitman Pierce, Nova Scotia (CA)

(73) Assignee: National Equity Inc. (CA)

( * ) Notice: Subject to any disclaimer, the term of this patent is extended or adjusted under 35 U.S.C. 154(b) by 1251 days.

(21) Appl. No.: 11/847,958

(22) Filed: Aug. 30, 2007

(65) Prior Publication Data

US 2008/0195424 A1 Aug. 14, 2008

(30) Foreign Application Priority Data

Feb. 13, 2007 (CA) ..................................... 2578451
Aug. 1, 2007 (CA) ..................................... 2595742

(51) Int. Cl.
G06Q 40/00 (2012.01)
(52) U.S. Cl. .......................................................... 705/4
(58) Field of Classification Search .............. 705/35–45, 705/4
See application file for complete search history.

(56) References Cited

U.S. PATENT DOCUMENTS

| | | | |
|---|---|---|---|
| 6,725,201 B2 | 4/2004 | Joao | |
| 7,089,191 B2 | 8/2006 | Baron et al. | |
| 7,089,202 B1 | 8/2006 | McNamar et al. | |
| 7,113,913 B1 | 9/2006 | Davis et al. | |
| 2003/0023462 A1* | 1/2003 | Heilizer | 705/4 |
| 2003/0110122 A1* | 6/2003 | Nalebuff et al. | 705/38 |
| 2004/0088203 A1* | 5/2004 | Kakuwa et al. | 705/4 |
| 2005/0021453 A1* | 1/2005 | Lyman | 705/38 |
| 2007/0244777 A1* | 10/2007 | Torre et al. | 705/35 |

OTHER PUBLICATIONS

ERA Sellers Security Plan Information Packet. 2005-2006. http://filelibrary.myaasite.com/Content/33/33409/19882518.pdf.*

* cited by examiner

Primary Examiner — Kambiz Abdi
Assistant Examiner — Stephanie M Ziegle
(74) Attorney, Agent, or Firm — Thompson Hine L.L.P.

(57) ABSTRACT

A method of reducing the risk to a Vendor of a First House that the Vendor of the First House will have to pay the Monthly Carrying Costs associated with the First House in the event that the First House is not sold within an acceptable predefined or determinable period of time. The method includes, steps of calculating the Monthly Carrying Costs associated with the First House, establishing a Minimum Acceptable Price for the sale of the First House, and calculating the likelihood that the First House will not be sold at or above the Minimum Acceptable Price during the acceptable predefined or determinable period of time. The method further includes calculating the likely length of time required to sell the First House at or above the Minimum Acceptable Price, and other steps.

4 Claims, 2 Drawing Sheets

FIGURE 1

For a house within a price range $200,000.00 to $225,000.00 in Halifax, Nova Scotia

| Period of Time from Listing Date | Likelihood House Will Sell During This Period |
|---|---|
| Elimination Period | 85% |
| Within 30 days after Elimination Period | 8.5% |
| Within 31 - 60 days after Elimination Period | 2.0% |
| Within 61 - 90 days after Elimination Period | 1.5% |
| Within 91 - 120 days after Elimination Period | 1.0% |
| Within 121 - 150 days after Elimination Period | 1.0% |
| Within 151 - 180 days after Elimination Period | .75% |
| More than 180 days after Elimination Period | .25% |

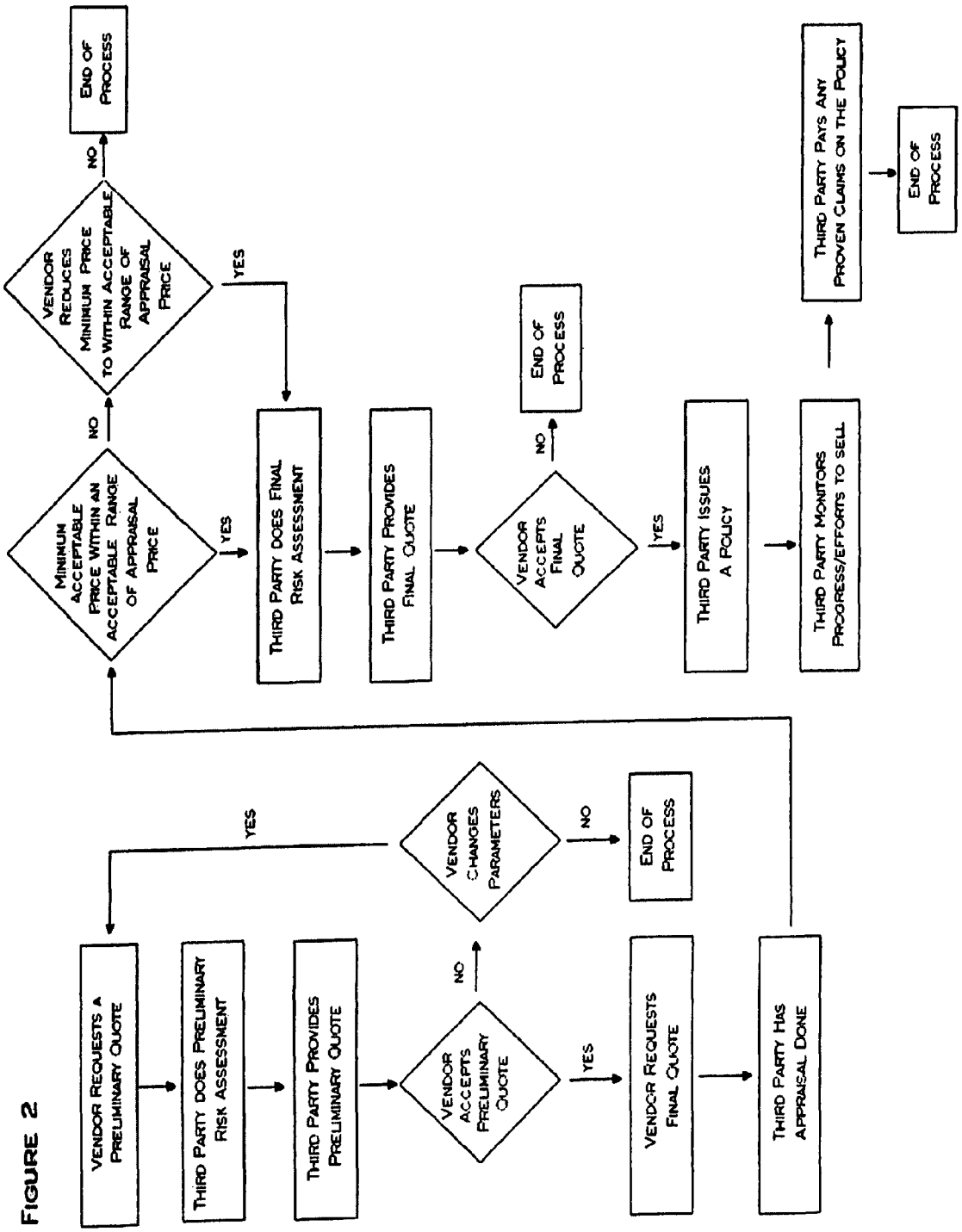

SYSTEM, METHOD AND INSURANCE PRODUCT FOR INSURING REAL ESTATE TRANSACTIONS

TECHNICAL FIELD

The present disclosure relates to an insurance-type product, methodology and system, and more particularly relates to an insurance-type product, methodology and system in relation to one or more real estate sales transactions.

BACKGROUND

It is a common practice for individuals to rely on the proceeds from the sale of one house or real estate property (hereinafter a "First House") as a major source of funding toward the purchase of another house or real estate property (hereinafter a "Second House"), and, to effect this strategy, make an offer on the Second House which is conditional on the sale of the First House. In a typical real estate transaction, this type of offer may be open for a fixed period of time, such as, for example, 90 days, or less, it being understood that a wide variety of different arrangements can be devised. In such a case, in the event that the First House is not sold within the fixed period of time, the vendor of the First House can either remove the condition and proceed with the purchase of the Second House despite not having sold the First House, or alternatively, not remove the condition and permit the offer to purchase the Second House expire.

Although a conditional offer may be better than no offer at all, nevertheless, there are drawbacks presented by such a conditional offer. For example, as the vendor of the Second House does not know, with certainty, that the First House will sell, and there is no assurance that the vendor of the First House will have the funds necessary to proceed with the purchase of the Second House, in the event that the conditional offer expires (the condition having not been removed by the vendor of the First House), the vendor of the Second House cannot proceed with the sale of the Second House, and must start the cycle again of seeking out another opportunity to sell the Second House.

Furthermore, the purchaser of the Second House does not know with certainty whether or not the Second House can be purchased, or whether or not the condition can be removed, in the event that the First House is not sold during the fixed period of time in which the conditional offer is open. While the purchaser of the Second House can, of course, remove the condition at any time, and possibly, with the aid of bridge financing, proceed with the purchase of the Second House, if the purchaser's First House does not sell quickly, the purchaser of the Second House faces the risk of potentially owning two properties (which typically would require the individual to make two sets of mortgage payments, insurance payments, taxes, maintenance and other expenses on both houses), and may have great difficulty or be unable to carry both houses, putting the purchaser at risk of having to sell one of the properties at a loss or otherwise making alternative arrangements for financing.

It is desirable to have access to protection against the uncertainties of the marketplace, particularly as it relates to relatively expensive items such as homes and real estate and the length of time that may be necessary to effect the sale of a particular property, and to be able to reduce, mitigate or substantially eliminate the risks associated with a single or multiple real estate transactions in a convenient, cost effective and simple manner.

SUMMARY

Accordingly, a system, method and insurance product is provided for reducing, mitigating or substantially eliminating some of the financial risks associated with the possibility of not being able to sell a house or real estate at or near fair market value within a predefined or determinable period of time.

The system, method and insurance product identifies risks, and is adapted to calculate or otherwise determine the premiums payable to an insurer in exchange for the insurer assuming some or all of the risks associated with paying or providing for the payment of certain costs and/or taxes and/or expenses relating to a house or real estate which is for sale and which has not yet been sold.

According to one aspect, there is provided a method of reducing the risk to a Vendor of a First House that the Vendor of the First House' will have to pay the Monthly Carrying Costs associated with the First House in the event that the First House is not sold within an acceptable predefined or determinable period of time, comprising the steps of, calculating the Monthly Carrying Costs associated with the First House, establishing a Minimum Acceptable Price for the sale of the First House, calculating the likelihood that the First House will not be sold at or above the Minimum Acceptable Price during the acceptable predefined or determinable period of time and calculating the likely length of time required to sell the First House at or above the Minimum Acceptable Price, calculating the potential claim exposure of having to pay the Monthly Carrying Costs after the acceptable predefined or determinable period of time until the First House is sold at or above the Minimum Acceptable Price, calculating a premium to be charged to the Vendor, the Vendor entering into an agreement with a Third Party, wherein the Vendor agrees to pay the premium, and the Third Party agrees to pay the Monthly Carrying Costs associated with the First House in the event that First House is not sold within the acceptable predefined period of time and until such time as the First House is sold at or above the Minimum Acceptable Price.

According to another aspect, there is provided an insurance policy agreement in written form adapted to reducing the risk to a Vendor of a First House that the Vendor of the First House will have to pay the Monthly Carrying Costs associated with the First House in the event that the First House remains unsold after an acceptable or predefined or determinable period of time, the agreement being entered into between the Vendor of the First House and a Third Party, the agreement comprising a term wherein the Vendor agrees to pay to the Third Party an amount related to the calculated claims exposure to the Third Party, and a term wherein the Third Party agrees to pay to the Vendor, on a monthly basis, an amount equal to the Monthly Carrying Costs of the First House while it remains unsold after the acceptable or predefined or determinable period of time.

According to another aspect, there is provided a system for reducing the risk to a Vendor of a First House that the Vendor of the First House' will have to pay the Monthly Carrying Costs associated with the First House in the event that the First House is not sold within an acceptable or predefined or determinable period of time, comprising the following elements, data related to the likelihood that the First House will not sell within the acceptable or predefined or determinable period of time, a programmed digital processor adapted to receive the data related to the likelihood that the First House will not sell within the acceptable or predefined or determinable period of time, adapted to calculate a number related to the potential claims exposure to a Third Party insurer of having to pay the Monthly Carrying Costs of the First House while it remains unsold after the acceptable or predefined or determinable period of time, an insurance policy agreement being entered into between the Third Party and the Vendor of a First House wherein the Vendor pays to the Third Party an amount related to the calculated claims exposure to the Third Party, the insurance policy agreement being adapted to require the monthly payment by the Third Party to the Vendor of an amount equal to the Monthly Carrying Costs of the First House while it remains unsold after the acceptable or predefined or determinable period of time.

Advantageously, the system, method and insurance product provides for the Vendor of a First House with an insurance policy type product and a method and system for identifying, evaluating and thereafter for reducing, mitigating or substantially eliminating some or all of the financial risks associated with the possibility of not being able to sell a house or real estate at or near fair market value within a predefined or determinable period of time and provides a method and system for paying or providing for the payment of certain expenses relating to a house or real estate which is available for sale and which has not yet been sold.

BRIEF DESCRIPTION OF THE DRAWINGS

FIG. 1 is a table setting out the likelihood that a house in the Halifax, Nova Scotia marketplace within a predetermined price range of $200,000.00 to $225,000.00 will sell during the Elimination Period and thereafter.

FIG. 2 is a flow chart demonstrating the methodology of a preferred aspect of the disclosure.

DETAILED DESCRIPTION

In general, an insurance-type product and methodology and system is provided which transfers some or all of the risk that a First House will not be sold within a particular or predetermined or determinable length of time, the risk being transferred in whole or in part from the Vendor (as that term is more fully described herein) of that First House, to a Third Party (as that term is more fully described herein).

The system method and insurance product may be utilized in the context of the below-described scenarios, with appropriate and applicable modifications thereto.

Description of the Scenarios to which the disclosure may be applicable:
1. Where the vendor of a First House (referred to herein as the "Vendor") intends to Purchase a Second House:
   (a) The Vendor has a mortgage on the First House and intends to proceed with the purchase of a Second House, while at the same time, is desirous of reducing, or mitigating or eliminating some or all of the financial risk of having to pay the mortgage and other expenses/costs of the First House should the sale of the First House not occur until subsequent to the Vendor's closing of the Vendor's purchase of the Second House (or subsequent to a predetermined or determinable period of time); or
   (b) the Vendor has no mortgage on the First House and intends to proceed with the purchase of a Second House, and is desirous of reducing, or mitigating or eliminating some or all of the financial risk of having to pay the other (non-mortgage) expenses/costs of the First House should the sale of the First House not occur until subsequent to the Vendor's closing of the Vendor's purchase of the Second House (or subsequent to a predetermined or determinable period of time);
2. Where the Vendor does not intend to Purchase a Second House:
   (a) the Vendor of the First House has a mortgage on the First House and has no intention of purchasing a Second House, and is desirous of reducing, or mitigating or eliminating some or all of the financial risk of having the First House remain on the market for an extended period of time (or subsequent to a predetermined or determinable period of time);
   (b) the Vendor of the First House has no mortgage on the First House and has no intention of purchasing a Second House, and is desirous of reducing, or mitigating or eliminating some or all of the financial risk of having the First House remain on the market for an extended period of time (or subsequent to a predetermined or determinable period of time).

In respect of each of the above-described scenarios, there is provided, with appropriate and applicable modifications, a system for, a method of, and an insurance type product for reducing, mitigating or eliminating some or all of the applicable above-referenced financial risks to the Vendor.

With reference generally to FIG. 2 which provides a generalized description of one aspect of the disclosure, where the Vendor of a First House wishes to sell the First House and, in the case of a scenario of Type 1A, 1B, 2A or 2B, upon the Vendor determining that it is desirable to reduce, mitigate or eliminate some or all of the risk of having the First House remain on the market, in the case of scenarios 1A and 1B subsequent to the closing date of the Vendor's purchase of the Second House (or subsequent to a predetermined or determinable period of time), and in the case of scenarios 2A and 2B, an extended period of time (or subsequent to a predetermined or determinable period of time), the Vendor and a third party (hereinafter the "Third Party") commence taking steps which when successfully concluded will result in an agreement being entered into between the Third Party (or a vendor of insurance products), and the Vendor as more fully described herein. In one aspect, the Third Party is an insurance company or is authorized to sell insurance products such as the one described herein, or an entity acting on behalf of, or a direct agent of an insurance company, including for example (unless prohibited by law or regulation), Realtors, brokers, and others.

In a preferred aspect, the Vendor has listed, or is required to list, the First House through a real estate agent, and preferably through one having access to a service such as the MLS (Multiple Listing Service) system to give broad exposure to the First House in the real estate market, it being understood that while this is desirable, in alternative aspects the Vendor may be selling the First House using various different techniques, including selling it personally without the assistance of a real estate agent, it being understood that in such a scenario, the agreement with the Third Party would be appropriately modified to accommodate such an aspect.

In such a preferred aspect, the following steps may be taken:
1. The Vendor Requests a Preliminary Quote from the Third Party:
   In this step, the Vendor requests a Preliminary Quote from the Third Party in which step, preferably the following information is supplied by the Vendor to the Third Party, preferably in electronic form (for example by completing an online/Internet accessible form, or alternatively, in electronic form such as in PDF format, HTML format, or other electronic format known to a person skilled in the art) or alternatively, in non-electronic form which may be readily converted to electronic form:

(a) the Vendor's name,
(b) the address of the First House,
(c) the postal code of the First House,
(d) the approximate monthly cost of carrying the First House (including for example, the taxes, property insurance, utilities, maintenance costs, associated with the First House, and in those scenarios where the Vendor has one or more mortgages on the First House, the total monthly cost of paying the one or more mortgages, which costs are hereinafter referred to as the "Monthly Carrying Costs");
(e) the estimated market value of the First House;
(f) the estimated listing price of the First House;
(g) the Vendor's desired coverage level (the amount of money that the Vendor desires/anticipates to be paid on a monthly basis in the event that the First House is not sold prior to an agreed to event or period of time);
(h) the Vendor's desired duration of full coverage (the number of months for which the Vendor desires full coverage);
(i) in the event that the Vendor is agreeable to have the full coverage decline after a specified/agreed to period of time, the Vendor's desired rate of decline from full coverage (preferably based on a percentage of decline per month);
(j) the minimum price at which the Vendor is agreeable to selling the First House (hereinafter referred to as the "Minimum Acceptable Price");
(k) whether the Vendor wants to be paid only in the event that a certain specified event does (or does not) take place (for example, the Vendor only wants to be paid in the event that the Vendor has closed on the purchase of Second House in respect of which the Vendor has made an offer, but still has not sold his First House).

2. The Third Party Performs a Preliminary Risk Assessment:
The Third Party performs a Preliminary Risk Assessment in relation to the information/data provided by the Vendor in the Vendor's Request for a Preliminary Quote (Step 1) received from the Vendor:
(a) the Third Party receives the above-referenced information/data (and if not in electronic form, preferably, converts it into electronic form) from the Vendor and preferably stores the above-reference information/data in a database, spreadsheet or other structured and retrievable form on an electronic data storage device such as a hard drive, CD-ROM or other electronic data storage device known to a person skilled in the art, which electronic data storage device is accessible by a computer or other programmable or preprogrammed data processing device (hereinafter referred to as a "programmable data processing device");
(b) the Third Party preferably receives from an Appraiser, a quote on the cost of or fee for providing an appraisal of the market value of the First House (and other specified information/data), or alternatively, has already received this information from the Appraiser (which quote is hereinafter referred to as the "Appraisal Fee Quote");
(c) the Third Party receives (or alternatively, has already received) information/data (from, for example, a real estate association such as the Canadian Real Estate Association CREA or other similar entity or any other entity with access to the below-referenced information/data) relating to:
  (i) the historical average number of days required to sell a property comparable to the First House in the same geographic area as the First House, or alternatively proximate the geographic area of the First House,
  (ii) the historical sale price of a property comparable to the First House in the same geographic area as the First House, or alternatively proximate the geographic area of the First House
or alternatively, has already received the above-referenced information, and preferably stores, or alternatively has already stored, this information/data in a database, spreadsheet or other structured and retrieval format on an electronic data storage device such as a hard drive, CD-ROM or other electronic data storage device known to a person skilled in the art;
(d) the Third Party accesses any of its own or industry-collected information/data relating to:
  (i) the historical average number of days required to sell a property comparable to the First House in the same geographic area as the First House, or alternatively proximate the geographic area of the First House,
  (ii) the historical sale price of a property comparable to the First House in the same geographic area as the First House, or alternatively proximate the geographic area of the First House.
(e) utilizing historical information/data from the Third Party's own experience and/or historical information/data from CREA or other similar entities or any other entity having access to historical information/data relating to the historical average number of days required to sell a property comparable to the First House in the same geographic area as the First House, or alternatively proximate the geographic area of the First House and the historical sale price of a property comparable to the First House in the same geographic area as the First House, or alternatively proximate the geographic area of the First House, the Third Party calculates the length the Elimination Period (that is, a period of time, typically, although not necessarily, in days, weeks or months immediately following the date of the listing of the First House, in which the Vendor will be required to carry all of the risk of not being able to sell the First House, a typical Elimination Period for a particular market and price range may be that length of time in that particular market for 85% of sales of houses in that price range to be affected; for example, in one aspect, if in a marketplace, 85% of all properties in a price range sold within 90 days of being listed, in that example, 90 days would be the Elimination Period for that marketplace and price range, it being understood that the Elimination Period may vary over time as the market conditions in the marketplace vary, based on, for example, market demand, market supply, time of year, local economic conditions and other factors known to a person skilled in the art;
Utilizing the above-referenced information/data from Step 1 and the present step, the Third Party performs the relevant actuarial calculations based on the supplied information/data and the relevant historical data available to it, and on a preliminary basis, assesses the risk to the Third Party that it will have to pay some or all of the Monthly Carrying Costs for the First House (or alternatively, at the level of coverage requested by the Vendor if this is less than the Monthly Carrying Costs for the First House).

3. The Third Party Provides a Preliminary Quote:
Based upon the Preliminary Risk Assessment in Step 2 (and the Third Party's expenses/costs, expectation of profit on any agreement subsequently reached between the Vendor and the Third Party and such other factors as would be known to a person skilled in the art) the Third Party issues a Preliminary Quote and preferably a Preliminary Quote Reference Number to the Vendor, which Preliminary Quote provides a preliminary and informal/nonbinding calculation of the premium tentatively expected to be paid by the Vendor should an agreement be entered into between the Vendor and the Third Party, and preferably includes a requirement that, before any further steps are taken in relation to this matter, the Vendor pre-pay to the Third Party the Appraisal Fee Quote.

In one aspect, the Third Party provides access to an Internet site, or other data entry forms or protocols which allow the Vendor to rapidly and easily provide various different scenarios to the Third Party for the purposes of obtaining a Preliminary Quote (the Vendor being able to modify, for example, the desired coverage level and the duration of full coverage or other factors) to the Third Party, the Third Party thereafter providing Preliminary Quotes for each of these different scenarios, to assist the Vendor in selecting the preferred scenario for consideration.

4. The Vendor Accepts to Proceed Further and to Request an Appraisal and Final Quote:
   (a) in the preferred aspects, the Vendor accepts the Preliminary Quote supplied by the Third Party, and, in preferred aspects, pre-pays to the Third Party the Appraisal Fee Quote (in a preferred aspects, this payment may be made, for example, by way of a credit card, which relevant credit card information and authorization to deduct the amount from the credit card is provided by the Vendor to the Third Party in an online transaction in a manner known to a person skilled in the art);
   (b) in preferred aspects, the Vendor provides the Third Party (preferably in electronic form (for example by completing an online/Internet accessible form, or alternatively, in electronic form such as in PDF format, HTML format, or other electronic format known to a person skilled in the art) or alternatively, in non-electronic form which may be readily converted to electronic form) with detailed information/data regarding the Monthly Carrying Costs, including for example, the outstanding mortgage amount (where applicable), the monthly mortgage payments (where applicable), the monthly taxes (where applicable), the monthly property insurance (where applicable), the monthly utilities (where applicable), monthly maintenance fees (where applicable) and any other costs associated with carrying the First House (it being understood that in an alternative aspect, this information/data may be provided during Step 1);
   (c) in the event that the Vendor is utilizing a real estate agent to assist in the selling of the First House, details of the real estate agent's name, address and related information is provided by the Vendor to the Third Party (it being understood that in an alternative aspect, this information/data may be provided during Step 1);

5. The Third Party obtains an appraisal in respect of the First House:
   (a) an appraisal is made in respect of the First House, and thereafter information/data is provided by the appraiser to the Third Party in relation to:
      (i) the appraiser's assessment of the market value of the First House,
      (ii) preferably, the appraiser's assessment of the length of time required to sell the house at the appraised market value of the First House;
      (iii) in one aspect, additional information/data such as the square footage of the house, the age of the house, the condition of the house, and such other data may be provided by the appraiser to the Third-Party to assist the Third-Party in assessing the risk to the Third Party that it will have to pay some or all of the Monthly Carrying Costs for the First House.

In the event that the Vendor's Minimum Acceptable Price is not less than or equal to a predetermined percentage of the appraised market value of the First House, the Third Party preferably notifies the Vendor that the Vendor's Minimum Acceptable Price is unacceptably high and preferably will require the Vendor to reduce the Vendor's Minimum Acceptable Price before issuing a Final Quote. In the event that the Vendor does not reduce the Minimum Acceptable Price to an amount less than or equal to a predetermined percentage of the appraised market value of the First House, the Third Party preferably notifies the Vendor that it is terminating further interaction with the Vendor in relation to the Vendor's efforts to obtain a policy agreement with the Third-Party in relation to the sale of the First House. In a preferred aspect, the predetermined percentage of the appraised market value of the First House below which the Vendor's Minimum Acceptable Price must be within an acceptable range of the appraised value of the First House, it being understood that the Third Party has flexibility in this regard, which flexibility may be used to modify the risk being assumed by the Third-Party it being understood that the range may also depend upon such factors as the local marketplace for houses, the willingness of prospective purchasers to purchase houses in the marketplace at, near or above the listing price, and other factors known to a person skilled in the art).

6. The Third Party assesses the risk to the Third Party that it will have to pay some or all of the Monthly Carrying Costs for the First House and the premium to be charged to Vendor:
   (i) utilizing the information/data supplied by the Vendor, CREA (or other entity), the appraiser and its own history information/data, which preferably has been stored in a database, spreadsheet or other structured and retrievable form on an electronic data storage device such as a hard drive, CD ROM or other electronic data storage device, which electronic data storage device is accessible by a preprogrammed data processing device, the Third Party (preferably utilizing the preprogrammed data processing device) performs the relevant actuarial calculations based on the supplied data and the relevant historical data available to it, and assesses the risk to the Third Party that it will have to pay some or all of the Monthly Carrying Costs for the First House, and based upon this assessment (and the Third Party's expenses/costs, expectation of profit on any agreement subsequently reached between the Vendor and the Third Party and such other factors as would be known to a person skilled in the art) issues a Final Quote and preferably a Final Quote Reference Number to the Vendor, which Final Quote includes the premium to be paid by the Vendor (and in one aspect, includes a reduction therefrom corresponding to the Appraisal Fee Quote if that fee was already paid by the Vendor during Step 4);

In one aspect, the Final Quote is provided in written/paper form (or in one aspect, in a form or document presented on a computer generated screen which preferably includes a method by which, if agreeable to the Vendor, may be acknowledged by the Vendor as having been agreed to in a way that legally binds the Vendor to the terms and conditions in the proposed Agreement) which Final Quote, in one aspect, includes a proposed Agreement which incorporates the terms and conditions to be agreed to between the Vendor and the Third Party and upon which the Final Quote is based, which proposed Agreement will include the terms of payment for the premium, and the conditions for payment to the Vendor under the policy to be prepared by the Third Party, and other terms and conditions that may be relevant or required by law in the relevant jurisdiction.

In one aspect, the following additional information is provided to the Vendor, namely:
  (a) The "appraised" value of the house (that is, the value attributed to the First House by the Appraiser in Step 5);
  (b) The "fair market" value of the house (that is, in preferred aspects a value within a range of the appraised value of the First House, which represents the number at or below which the Vendor's Minimum Acceptable Price must be);
  (c) The agreed to "elimination period" and/or the agreed to event which will trigger payment under any policy (for example, the Vendor has closed on the purchase of the Second House but the sale of the First House has not yet occurred);
  (d) the agreed to duration of full coverage (the number of months for which the Vendor will have full coverage of the Monthly Carrying Costs);
  (e) in the event that the Vendor is agreeable to have the full coverage decline after a specified/agreed to period of time, the agreed to rate of decline from full coverage (preferably based on a percentage of decline per month).

7. The Vendor Accepts the Final Quote from the Third Party and the Third Party Collects Additional Information Regarding the First House:
  (i) in the event that the Vendor is agreeable to the terms and conditions proposed by the Third Party in the proposed Agreement and Final Quote, the Vendor may either sign the proposed Agreement, or if the proposed Agreement is in an electronic form, provides acknowledgment to the Third Party that the Vendor is in agreement with the proposed Agreement;
  (ii) in the event that the Vendor has retained the services of a real estate agent, the Third Party preferably obtains the following information/data from the real estate agent:
    (a) the real estate agent's name and any unique identifier number for the real estate agent;
    (b) the real estate agent's firm and information relating thereto, including address, telephone number and other such indicia;
    (c) the listing date for the First House;
    (d) the listing term for the First House;
    (e) the listing price for the First House;
    (f) if Multiple Listing Service is being utilized, the Multiple Listing Service number.

8. The Third Party Issues a Policy
  (i) a policy (preferably in written form, or alternatively, presented to the Vendor in electronic form so that the Vendor may save and access the policy electronically) is prepared utilizing the above referenced information/data, and preferably utilizing a preprogrammed data processing device which has access to the above referenced information/data (stored for example in a database, spreadsheet or other structured and retrievable form on an electronic data storage device such as a hard drive, or other electronic data storage device);
  (ii) in preferred aspects, the policy includes the following information, in addition to the terms and conditions governing the policy:
    (a) the name of the policyholder;
    (b) the address of the First House;
    (c) the postal code of the First House;
    (d) the age of the First House (and in one aspect, the condition of the First House);
    (e) the policy number;
    (f) the final quote reference number;
    (g) the total premium paid;
    (h) the appraisal fee;
    (i) the realtor's name;
    (j) the real estate agency name;
    (k) the listing date;
    (l) the term (length of time) for the listing;
    (m) the MLS number if the Vendor has utilized the services of MLS;
    (n) the appraised market value for the First House;
    (o) the list price for the First House;
    (p) the fair market price for the First House;
    (q) the minimum acceptable price for the First House;
    (r) the agreed-to "elimination period" and/or the agreed to event which will trigger payment under any policy (for example, the Vendor has closed on the purchase of the Second House but the sale of the First House has not yet occurred);
    (s) the agreed-to duration of full coverage (the number of months for which the Vendor will have full coverage of the Monthly Carrying Costs);
    (t) in the event that the Vendor agreed to have the full coverage decline after a specified/agreed to period of time, the agreed to rate of decline from full coverage (the decline preferably being 5% per month or some other value as agreed upon by the Vendor and Third Party, so that in the case of a 5% decline, for each month during the period of declining coverage, the amount to be paid by the Third Party to the Vendor is reduced by 5% (or such other agreed to amount) from the previous month until the amount to be paid by the Third Party to the Vendor falls below a predetermined amount, such as, for example, $50.00 or some other agreed-to amount);
    (u) the full coverage amount (that is, the maximum full coverage amount to be paid on a monthly basis by Third Party to the Vendor under any claim under the policy).

9. Third Party's Post Policy Issuance Monitoring of the Progress in relation to the First House
  Subsequent to the issuance of the policy, the Third Party may monitor the sales efforts, sales activity, pricing changes and other matters in relation to the possible sale of the First House, including, obtaining up-to-date information regarding the current listing price, and obtaining copies of any bona fide offers to purchase the First House (which may, for example, be obtained from the realtor, in the event that a realtor was retained to sell the First House).

10. Claims being made by the Vendor in relation to the First House
  In the event that the First House is not sold within an agree to period of time, or prior to an agreed to event, (or if applicable, should the Vendor close on the sale of the Vendor's purchase of the Second House prior to the sale of the First House), the Vendor may make a claim against the policy, preferably submitting to the Third Party the policy number and applicable proof that an event has occurred which will trigger payment under the policy and that the First House has not yet been sold.

The Third Party preferably confirms that:
(a) the First House has not yet been sold;
(b) the First House was continuously, throughout the coverage period, actively listed through MLS or equivalent (if this was a term or condition of the policy);
(c) the First House was continuously, throughout the coverage period, maintained in good condition;
(d) any Elimination Period has expired;
(e) an event has occurred which will trigger payment under the policy;
(f) that the Vendor did not receive any bona fide offers to purchase the First House at or above the "minimum acceptable" price.

Upon confirmation of the above-referenced, the Third Party pays out the agreed to amounts to the Vendor, for so long as and at the rate in the amount agreed to between the Third Party and the Vendor.

It is to be noted that in preferred aspects, it is desirable that the Third Party have access to and may place reliance on relevant historical information/data in relation to the geographic region, and the various different price ranges and property characteristics within that geographic region to improve the accuracy and reliability of the risk assessment process. In one aspect, this information/data may be made available from another entity, it being understood, that in preferred aspects, the Third Party collects and makes available to itself such information/data.

In one aspect, it is a requirement that the Vendor maintain an "Multiple Listing Service" (MLS, or other similar listing service) in relation to the First House. In one embodiment of the present invention, where a Multiple Listing Service is utilized, an automated computer implemented search routine is provided by the Third Party to regularly, and preferably daily, verify that the actual listing price of the First House does not exceed the agreed-to listing price in the agreement/policy, and if a determination is made that the actual listing price exceeds the agreed-to listing price in the agreement/policy, Vendor (and if applicable, the realtor) is/are notified of the discrepancy, and if the actual listing price continues to exceed the agreed-to listing price, the policy is canceled (appropriate terms and conditions are included in the finalized agreement and policy to permit this to happen automatically, or at the discretion of the Third Party).

In such an aspect, the Third Party has collected and/or has access to current and up-to-date experience data of the following nature (it being understood that in the preferred embodiment, the experience data is continuously being updated), namely on a market by market basis, historical data relating to the sale price of comparable properties in comparable locations; the actual amount of elapsed time taken to sell comparable properties in comparable price ranges and comparable locations at fair market value, and in the absence of, or supplemental to, such data, the estimated amount of time that will be required to sell specific properties at fair market value in specific subject markets and statistical data or analysis or information relating to the variances of such estimate.

In such an aspect, the Third Party's experience data/information and/or other data/information available to the Third Party includes data/information such as that provided in FIG. 1, namely the likelihood that a house in, for example, the Halifax, Nova Scotia marketplace, within a predetermined price range of $200,000.00 to $225,000.00 will sell during the Elimination Period and thereafter, and the relevant data/information provided about that house being preferably stored in a database, spreadsheet or other structured and retrievable form on an electronic data storage device such as a hard drive, CD-ROM or other electronic data storage device known to a person skilled in the art, which electronic data storage device is accessible by a computer or other programmable or pre-programmed data processing device, the Third Party utilizing such data/information to in the calculation of the risk that the First House will not be sold at or above the previously agreed to minimum acceptable price before the expiration of any predetermined Elimination Period, and in the calculation of the risk that the First House will not sell at or above the previously agreed to Minimum Acceptable Price over a range of predetermined periods subsequent to the Elimination Period, these steps (or one of them) being taken as intermediate steps in the process of calculating the overall claims exposure to the Third Party in the event that the Third Party enters into a policy agreement with the Vendor.

In other aspects, the Third Party determines the most likely date of sale of the First House, and for a range of dates before and after such date, the likelihood on each of those days within that range that the First House will sell at or above the previously agreed to Minimum Acceptable Price on those days. Using the results of this analysis and such factors as the Monthly Carrying Costs (and depending upon which optional or alternative features were pre-agreed to by the Vendor, such as the duration of full coverage, the Vendors' agreement to have the full coverage decline after a specified period, the length of any Elimination Period, the Minimum Acceptable Price that the Vendor is willing to accept and such other factors as are to be the subject of an agreement between the Vendor and the Third Party), the Third Party will calculate (in the preferred embodiment, by way of a suitably programmed computer or other suitably programmed data processor) the potential claims exposure in respect of the sale of the First House, (and in one embodiment of the present invention, taking into account other potential claim exposure of relevant policies of a similar nature in that marketplace), calculate and quote a policy premium to be paid by the Vendor (which premium will preferably also take into account the Third Party's overhead, cost of sale, profit and such other amounts as would be understood by a person skilled in the art). If the Vendor is agreeable to the premium amount and to such other terms and conditions as may be agreed to between the Vendor and the Third Party, a policy agreement, preferably in writing, may then be entered into between the Vendor and the Third Party, to have the Third Party accept all or some portion of the risk of carrying the agreed to costs associated with the First House past any agreed to point in time on such terms and conditions as are agreeable to the Vendor and Third Party, and any premium due to the Third Party in consideration of the policy being granted, is paid by the Vendor.

In preferred aspects, the Vendor is under no obligation to sell the First House for an amount less than the Minimum Acceptable Price.

In an aspect, a Third Party insurance product or policy is provided which is adapted to reducing or eliminating some or all of the risk to the Vendor that the Vendor will have to pay some or all of the Monthly Carrying Costs associated with the First House in the event that the First House is not sold within an acceptable or agreeable or predefined or determinable period of time and such other conditions and terms as are agreed to between the Third Party and the Vendor (which conditions and terms may include one or more conditions and terms as set out above), by way of an insurance policy between an insuring Third Party and the Vendor which will pay the agreed to portion of some or all of the Monthly Carrying Costs to the Vendor of the First House upon the failure of the Vendor to sell the First House within an agreed to, predefined or determinable period of time and/or such other terms and conditions (which conditions and terms may include one or more conditions and terms as set out above) as are agreed to between the insuring Third Party and the Vendor.

In another aspect, an insurance product is provided whereby an insurance policy is created by the Third Party for the Vendor identifying and recording the specific terms and conditions applicable to the policy (which terms and conditions may include one or more of the terms and conditions set out above), the policy transferring all or a portion of specified risk that the Vendor will have to pay some or all of the Monthly Carrying Costs after an acceptable or agreeable or predefined or determinable period of time, from the Vendor to the Third Party so as to reduce or mitigate some or all of the risk to the Vendor that the Vendor will have to pay some or all of the Monthly Carrying Costs associated with the First House in the event that the First House is not sold within an acceptable or agreeable or predefined or determinable period of time at or above the Minimum Acceptable Price.

In another aspect, experience data such as the historical average number of days required to sell a property comparable to the First House in the same geographic area as the First House, or alternatively proximate the geographic area of the First House and the historical sale price of a property comparable to the First House in the same geographic area as the First House, or alternatively proximate the geographic area of the First House is provided by the Third Party to an appropriately programmed computer or other programmed digital processor along with data relating to the Minimum Acceptable Price, the acceptable or agreeable or predefined or determinable period of time before which, if the First House is unsold, the Vendor has no right to make a claim under the policy agreement, the listing price and the Monthly Carrying Costs for the First House, the appropriately programmed computer or other programmed digital processor thereafter performing actuarial calculations utilizing such data/information and reporting to the Third Party information relating to the potential claim exposure to the Third Party of having to pay the Monthly Carrying Costs of the First House after the acceptable or agreeable or predefined or determinable period of time until the First House is sold at or above the Minimum Acceptable Price.

The present invention has been described herein with regard to various aspects and combinations of aspects, however, it will apparent that a number of variations and other modifications may be made without departing from the scope of the invention as set forth in the appended claims.

What is claimed is:

1. A method of reducing the risk to a Vendor of a First House that the Vendor of the First House will have to pay Monthly Carrying Costs associated with the First House in the event that the First House is not sold within an acceptable predefined or determinable period of time, comprising the steps of:
   storing information relating to the Monthly Carrying Costs and geographic area associated with the First House in a structured and retrievable form on an electronic data storage device;
   storing information relating to a Minimum Acceptable Price for the sale of the First House in a structured and retrievable form on the electronic data storage device;
   calculating by a digital processor, versus additional structured and retrievable information stored on the electronic data storage device which relates to:
   (i) an historical average number of days required to sell a property comparable to the First House located in the same geographic area as the First House, or alternatively located proximate the geographic area of the First House; and
   (ii) an historical sale price of a property comparable to the First House located in the same geographic area as the First House, or alternatively proximate the geographic area of the First House,
   the likelihood that the First House will not be sold at or above the Minimum Acceptable Price during the acceptable predefined or determinable period of time and calculating, by the digital processor versus the additional structured and retrievable information, a likely length of time required to sell the First House at or above the Minimum Acceptable Price;
   calculating a potential claim exposure of having to pay the Monthly Carrying Costs after the acceptable predefined or determinable period of time until the First House is sold at or above the Minimum Acceptable Price;
   calculating a premium to be charged to the Vendor; and
   entering into an agreement with the Vendor, wherein the Vendor agrees to pay the premium, and a Third Party agrees to pay the Monthly Carrying Costs associated with the First House in the event that First House is not sold within the acceptable predefined period of time and until such time as the First House is sold at or above the Minimum Acceptable Price.

2. A system for reducing the risk to a Vendor of a First House that the Vendor of the First House will have to pay Monthly Carrying Costs associated with the First House in the event that the First House is not sold within an acceptable predefined or determinable period of time, comprising the following elements:
   (1) an electronic data storage device having structured and retrievable data related to:
      (i) an historical average number of days required to sell a property comparable to the First House located in the same geographic area as the First House, or alternatively located proximate the geographic area of the First House; and
      (ii) an historical sale price of a property comparable to the First House located in the same geographic area as the First House, or alternatively proximate the geographic area of the First House;
   (2) a programmed digital processor adapted to receive:
      (i) information relating to the Monthly Carrying Costs and geographic area associated with the First House;
      (ii) information relating to a Minimum Acceptable Price for the sale of the First House; and
      (iii) the structured and retrievable data,
   adapted to calculate, versus the stored and retrievable data, the likelihood that the First House will not sell within the acceptable predefined or determinable period of time and a likely length of time required to sell the First House at or above the Minimum Acceptable Price, and adapted to calculate a number related to a potential claims exposure to a Third Party insurer of having to pay the Monthly Carrying Costs of the First House while it remains unsold after the acceptable predefined or determinable period of time; and
   an insurance policy agreement being entered into between the Third Party insurer and the Vendor of a First House wherein the Vendor pays to the Third Party insurer an amount related to the calculated number related to the potential claims exposure to the Third Party insurer, the insurance policy agreement being adapted to require the monthly payment by the Third Party insurer to the Vendor of an amount equal to the Monthly Carrying Costs of the First House while it remains unsold after the acceptable predefined or determinable period of time.

3. The method of claim 1 wherein said digital processor is programmed to calculate the potential claim exposure of having to pay the Monthly Carrying Costs after the acceptable predefined or determinable period of time until the First House is sold at or above the Minimum Acceptable Price.

4. The method of claim 1 wherein the third calculating step is carried out by said digital processor or another digital processor which is programmed to calculate the premium to be charged to the Vendor.

* * * * *